United States Patent [19]

Berneth et al.

[11] Patent Number: 5,785,718
[45] Date of Patent: Jul. 28, 1998

[54] SUBSTANTIVE STILBENE-AZO DYESTUFFS

[75] Inventors: Horst Berneth; Uwe Claussen, both of Leverkusen, Germany

[73] Assignee: Bayer Aktiengesellschaft, Leverkusen, Germany

[21] Appl. No.: 863,316

[22] Filed: May 27, 1997

[30] Foreign Application Priority Data

May 31, 1996 [DE] Germany ............... 196 21 865.9

[51] Int. Cl.⁶ .................... D06P 3/32; D06P 3/62
[52] U.S. Cl. .................... 8/437; 8/436; 8/481; 8/919; 8/920; 8/918; 8/924
[58] Field of Search .............. 8/436, 437, 918, 8/919, 920, 924, 662, 681

[56] References Cited

U.S. PATENT DOCUMENTS

| | | |
|---|---|---|
| 4,620,875 | 11/1986 | Shimada et al. |
| 4,940,783 | 7/1990 | Stingelin |
| 5,007,942 | 4/1991 | Claussen et al. |
| 5,203,876 | 4/1993 | Käser |
| 5,272,259 | 12/1993 | Claussen et al. |
| 5,340,504 | 8/1994 | Claussen |

FOREIGN PATENT DOCUMENTS

| | | |
|---|---|---|
| 2006427 | 6/1990 | Canada |
| 0035152 | 9/1981 | European Pat. Off. |
| 0306452 | 3/1989 | European Pat. Off. |
| 0352229 | 1/1990 | European Pat. Off. |
| 0374655 | 6/1990 | European Pat. Off. |
| 0376032 | 7/1990 | European Pat. Off. |
| 593144 | 2/1934 | Germany |
| 741469 | 11/1943 | Germany |
| 3512836 | 10/1985 | Germany |
| 56-133361 | 2/1980 | Japan |
| 88048906 | 3/1988 | Japan |
| 346309 | 6/1960 | Switzerland |

OTHER PUBLICATIONS

T.L. Dawson, Rev. Prog. Coloration, 22, 22 (1992), pp. 22–31.

Ullmann's Encyclopedia of Industrial Chemistry, VCH Verlagsgesellschaft mbH, 5th Edition, vol. A15, pp. 259–282 1990.

Ullmann's Encyclopedia of Industrial Chemistry, VCH Verlagsgesellschaft mbH, 5th Edition, vol. A18, pp. 545–547 1990.

Ullmann's Encyclopedia of Industrial Chemistry, VCH Verlagsgesellschaft mbH, 5th Edition, vol. A26, pp. 351–352 1990.

Primary Examiner—Margaret Einsmann
Attorney, Agent, or Firm—Sprung Kramer Schaefer & Briscoe

[57] ABSTRACT

The novel and known stilbene-azo dyestuffs of the formula (I)

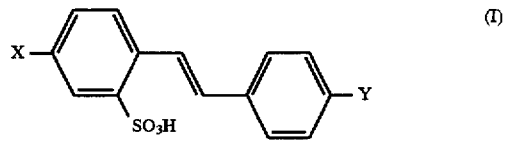

in which the substituents X and Y have the meaning given in the description, are outstandingly suitable for dyeing and printing cellulose and/or material containing amide groups and for the preparation of inks.

6 Claims, No Drawings

SUBSTANTIVE STILBENE-AZO DYESTUFFS

The present invention relates to novel stilbene-azo dyestuffs, processes for their preparation and processes for dyeing and printing material containing cellulose and/or amide groups, and furthermore processes for the preparation of liquid dyestuff preparations, in particular inks, using novel and/or known stilbene-azo dyestuffs.

Stilbene dyestuffs are already known from EP-A 376 032, where they are used for the production of light-polarizing films or foils.

A process has now been found for dyeing and/or printing materials containing cellulose and/or amide groups, which comprises employing as the dyestuff at least one stilbene-azo dyestuff which, in the form of the free acid, corresponds to the formula (I)

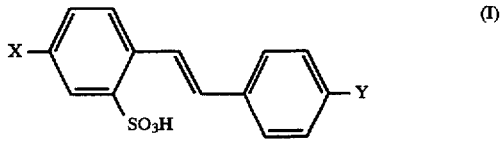

in which

X and Y independently of one another represent —$CF_3$, halogen, —$CONR^1R^2$, —COOH, —$COOR^3$, —CN, —$NO_2$, $NR^1R^2$, —OH, —$OR^3$, —$NHCOR^3$, —$NHCOOR^3$, —NHCONHR or —N=N—R, at least one of the radicals X or Y representing —N=N—R, and R represents a radical of the formula

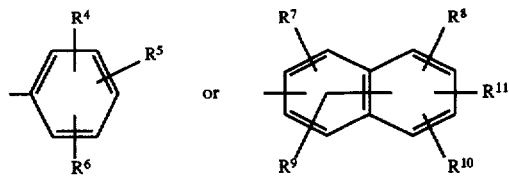

in which $R^4$, $R^5$, $R^6$, $R^7$, $R^8$, $R^9$, $R^{10}$ and $R^{11}$ independently of one another represent H, halogen, —OH, —$OR^3$, —$NR'R^2$, $R^3$, —$SO_3H$, —$SO_2NR^1R^2$, —O—$COR^3$ or —$NHCOR^3$ and $R^1$ and $R^2$ independently of one another represent hydrogen, or represent formyl, or represent in each case optionally $C_1$-$C_4$-alkyl-, hydroxyl-, $C_1$- to $C_4$-alkoxy-, amino-, $C_1$- to $C_4$-mono- or -dialkylamino-, morpholino-, piperidino-, N—$R^{12}$-piperazino-, halogen-, cyano-, nitro-, phenyl-, carboxyl-, $C_1$- to $C_4$-alkoxycarbonyl-, aminocarbonyl-, $C_1$- to $C_4$-mono- or -dialkylaminocarbonyl-, sulfo- or $OSO_3H$-substituted $C_1$- to $C_6$-alkyl, $C_1$- to $C_6$-alkylcarbonyl, $C_1$- to $C_6$-alkylsulfonyl, $C_1$- to $C_6$-alkoxycarbonyl, $C_1$- to $C_6$-mono- or -dialkylaminocarbonyl, $C_5$- to $C_7$-cycloalkyl, $C_6$- to $C_{10}$-aryl, $C_6$- to $C_{10}$-arylcarbonyl or $C_6$- to $C_{10}$-arylsulfonyl, or $R^1$ and $R^2$, together with the N atom to which they are bonded, represent a 5- to 7-membered saturated heterocyclic ring, which can additionally contain further heteroatoms from the series consisting of O, S, $SO_2$ and $NR^{12}$, wherein $R^{12}$ has the meaning of $R^1$ or $R^2$, and $R^3$ represents in each case optionally $C_1$-$C_4$-alkyl-, hydroxyl-, $C_1$-$C_4$-alkoxy-, halogen-, cyano- or nitro-substituted $C_1$- to $C_6$-alkyl, $C_6$- to $C_{10}$-aryl or $C_6$- to $C_{10}$-aryl-$C_1$-$C_6$-alkyl.

The process according to the invention is particularly suitable for dyeing and/or printing cotton, paper and leather. The dyestuffs of the formula (I) can furthermore be particularly advantageously employed for the preparation of inks, in particular those which are suitable for ink-jet recording apparatuses.

Stilbene-azo dyestuffs of the formula (I) which are preferably suitable for carrying out the process according to the invention are those in which X and Y independently of one another represent —CN, —$NO_2$, —$NH_2$, —$NHCOR^3$, —$NHCOOR^3$, —$NHCONHR^3$ or —N=N—R, at least one of the radicals X or Y representing —N=N—R, and R represents a radical

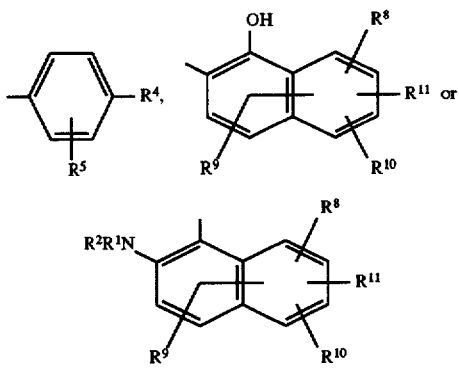

in which $R^1$, $R^2$, $R^4$, $R^5$, $R^8$, $R^9$, $R^{10}$ and $R^{11}$ have the abovementioned meaning.

Stilbene-azo dyestuffs of the formula (I) which are particularly preferred for carrying out the process according to the invention are those in which X and Y independently of one another represent —N=N—R, in which R represents a radical of the formula

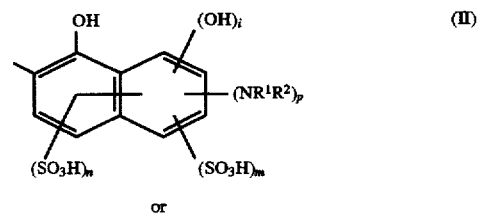

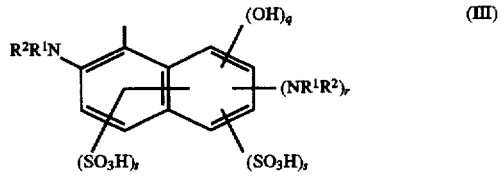

in which i, m, n, p, q, r, s and t independently of one another represent 0 or 1, where the sums are m+n=1 and s+t=1, and $R^1$ and $R^2$ have the abovementioned meaning.

Especially preferred stilbene-azo dyestuffs of the formula (I) are those in which X and Y independently of one another represent —N=N—R, in which R represents a radical of the formula (II) or (III), in which $R^1$ and $R^2$ independently of one another represent hydrogen, or represent optionally hydroxyl-, methoxy-, ethoxy-, amino-, methylamino-, ethylamino-, dimethylamino-, diethylamino-, morpholino-, piperazino-, N-ethylpiperazino-, N-hydroxyethylpiperazino-, N-aminoethylpiperazino-, fluorine-, chlorine-, carboxyl- or $OSO_3H$-substituted $C_1$- to $C_6$-alkyl, or represent in each case optionally hydroxyl-, methoxy-, ethoxy-, fluorine-, chlorine- or phenyl-substituted $C_1$- to $C_6$-alkylcarbonyl, $C_1$ to $C_6$-alkylsulfonyl, $C_1$- to $C_6$-alkoxycarbonyl or $C_1$- to $C_6$-mono- or -dialkylaminocarbonyl, or represent cyclopentyl or cyclohexyl, or represent in each case optionally methyl-, ethyl-, hydroxyl-, methoxy-, ethoxy-, fluorine-, chlorine-, amino-, cyano-, nitro-, carboxyl-, aminocarbonyl- or sulfo-substituted phenyl, naphthyl, benzoyl, naphthylcarbonyl, benzenesulfonyl or naphthalenesulfonyl, or $R^1$ and $R^2$, together with the N atom to which they are bonded, represent morpholino, piperazino, N-ethylpiperazino, N-hydroxyethylpiperazino, N-aminoethylpiperazino or

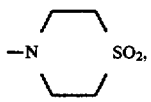

n, p, q and s represent 1 and m, i, r and t independently of one another represent 0 or 1.

The use according to the invention of stilbene-azo dyestuffs of the formula (I) in which X and Y are identical and preferably represent —N=N—R, in which R has the abovementioned meaning, is particularly preferred.

Stilbene-azo dyestuffs of the formula (I) which are furthermore particularly preferred for carrying out the process according to the invention are those in which X represents a radical of the formula (IV) which, in the form of its free acid, corresponds to the formula

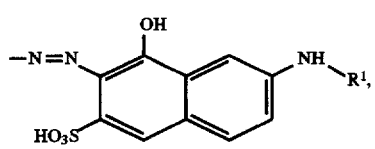

in which $R^1$ represents hydrogen, phenyl, methoxyphenyl, hydroxyethoxyphenyl, carboxyphenyl, dicarboxyphenyl or sulfophenyl, and Y represents a radical of the formula (IVa), (V), (VI) or (VII) which, in the form of the free acid, corresponds to the formula

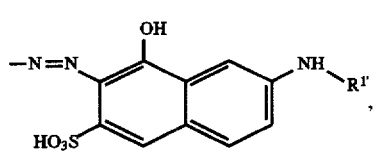

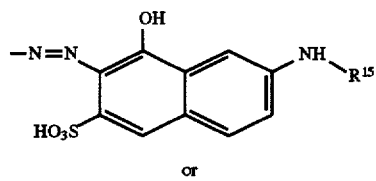

in which $R^{1'}$ has the same meaning as $R^1$, but $R^1$ and $R^{1'}$ are preferably not identical if X represents a radical (IV) and Y represents a radical (IVa).

The stilbene-azo dyestuffs of the formula (I) can be employed in the process according to the invention individually or as any desired mixture with one another.

The color shade can thus easily be established in the desired manner by choice of a suitable dyestuff mixture. Furthermore, such mixtures as a rule have better solubilities, which facilitate the preparation of stable dyestuff solutions or inks.

Stilbene-azo dyestuffs which, in the form of their free acid, correspond to the formula (I) in which X represents a radical of the formula (VIII) or (IX), shown in the form of its free acid

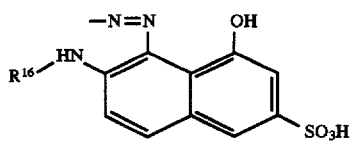

and

Y represents a radical of the formula (VIIIa), (X), (XI) or (XII), shown in the form of its free acid

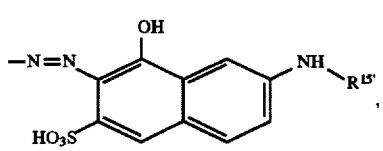

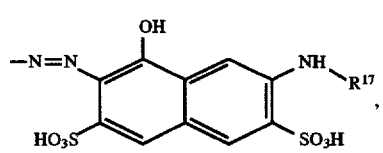

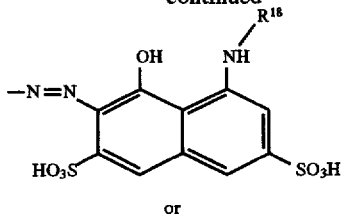

(XI)

or

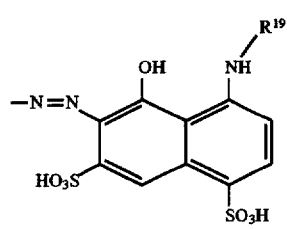

(XII)

in which

- $R^{15}$, $R^{15'}$ and $R^{17}$ independently of one another represent hydrogen, $C_1$- to $C_6$-alkyl, ω-dimethyl- or diethylamino-$C_3$- to -$C_5$-alkyl, ω-carboxy-$C_2$- to -$C_{15}$-alkyl, formyl or $C_1$- to $C_6$-alkylcarbonyl, or represent in each case optionally methyl-, ethyl-, hydroxy-, methoxy-, ethoxy-, chlorine-, bromine-, cyano-, nitro-, carboxyl- or sulfo-substituted phenyl or benzoyl,
- $R^{16}$ represents hydrogen, $C_1$-$C_6$-alkyl or optionally methyl-, ethyl-, hydroxy-, methoxy-, ethoxy-, chlorine-, bromine-, cyano-, nitro-, carboxy- or sulfo-substituted phenyl and
- $R^{18}$ and $R^{19}$ independently of one another represent hydrogen, formyl, $C_1$- to $C_6$-alkylcarbonyl or optionally methyl-, ethyl-, hydroxy-, methoxy-, ethoxy-, chlorine-, bromine-, cyano-, nitro-, carboxy- or sulfo-substituted benzoyl, wherein, in the case where X represents a radical of the formula (VIII) and Y represents a radical of the formula (VIIIa) and $R^{15'}$ and $R^{15}$ are identical, these do not simultaneously represent acetyl, phenyl, benzoyl or 4-chlorophenyl, are novel and the present invention also relates to these dyestuffs.

Stilbene-azo dyestuffs of the formula (I) which are to be singled out are those in which X corresponds to the formula (VIII), where $R^{15}$=hydrogen, phenyl, methylphenyl, methoxyphenyl, carboxyphenyl or sulfophenyl, and Y corresponds to one of the formulae (X) to (XII), where $R^{17}$= hydrogen, acetyl, phenyl or benzoyl and $R^{18}$=$R^{19}$= hydrogen, acetyl or benzoyl.

Stilbene-azo dyestuffs which are furthermore preferred are those of the formula (Ia)

Stilbene-azo dyestuffs of the formula (Ia) which are to be singled out in particular are those in which $R^{15'}$ and $R^{15}$ are identical and represent hydrogen, methylphenyl, methoxyphenyl, carboxyphenyl or sulfophenyl.

Stilbene-azo dyestuffs of the formula (Ia) which are likewise to be singled out are those in which $R^{15}$ represents hydrogen, phenyl, methylphenyl or methoxyphenyl and $R^{5'}$ represents carboxyphenyl or sulfophenyl.

The alkyl groups mentioned, including those in derived or composite terms, such as alkoxy, alkylamino, alkoxycarbonyl, alkylaminocarbonyl, alkylcarbonyl or alkylsulfonyl, can be straight-chain or branched and optionally substituted by radicals such as, for example, hydroxyl, $C_1$- to $C_4$-alkoxy, halogen, cyano, carboxyl, sulfo, $OSO_3H$ and/or NR'R$^2$.

Aryl preferably denotes phenyl or naphthyl.

Halogen is to be understood as meaning, in particular, fluorine, chlorine or bromine.

The novel stilbene-azo dyestuffs can be prepared by a procedure analogous to that described in EP-A 0 376 032.

The preparation is thus carried out, for example, by tetrazotization of 4,4'-diaminostilbene-2-sulfonic acid of the formula

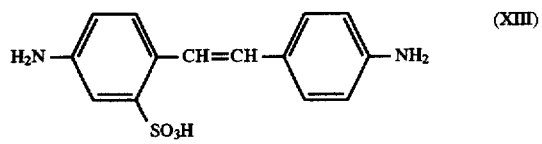

(XIII)

and coupling of the tetrazotization product to naphthalene compounds of the formula

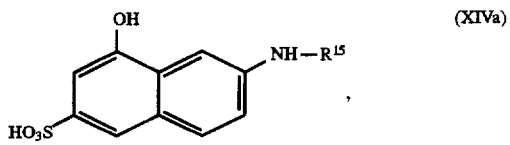

(XIVa)

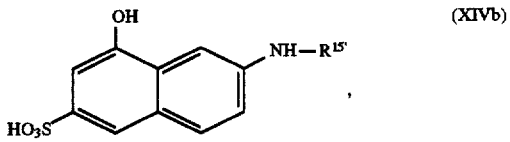

(XIVb)

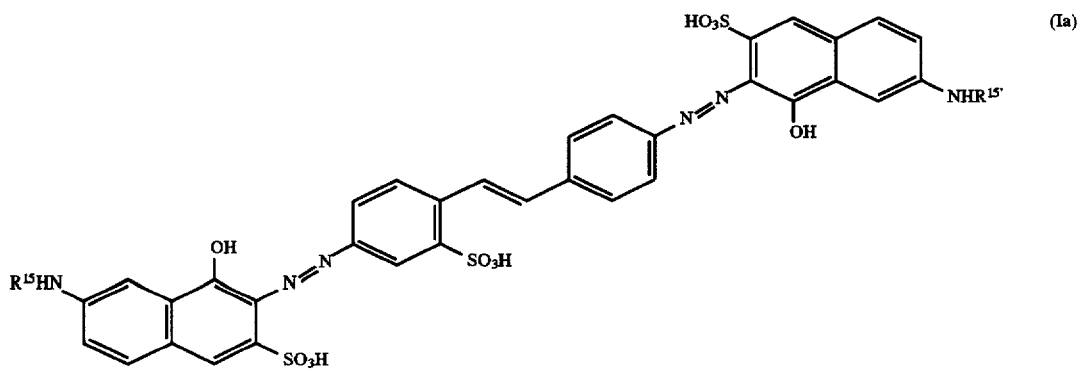

(Ia)

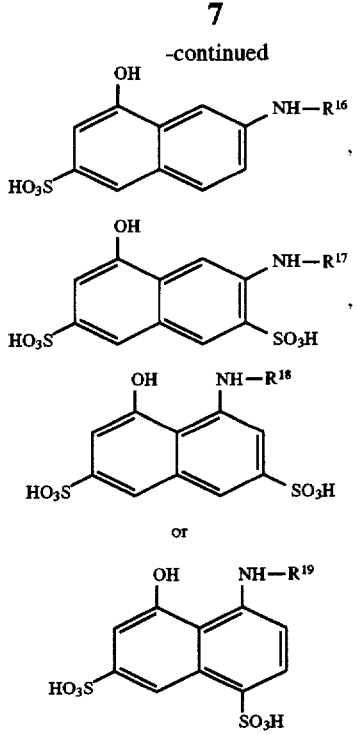

in which $R^{15}$, $R^{15'}$, $R^{16}$, $R^{17}$, $R^{18}$ and $R^{19}$ have the above-mentioned meanings, or a mixture thereof.

The preparation can also be carried out, however, by diazotization of the 4-aminostilbene-2- or -2'-sulfonic acids of the formula

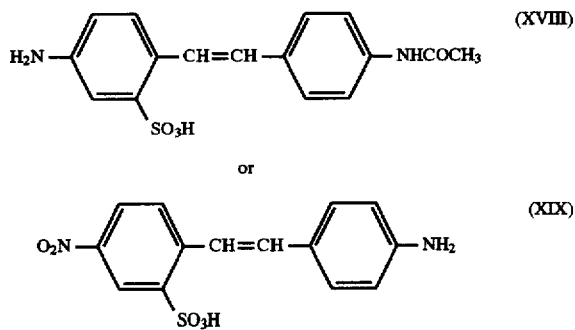

and coupling of the diazotization product to naphthalene compounds of the formula (XIVa–c), (XV), (XVI) or (XVII), subsequent hydrolysis of the acetamino group, for example in aqueous hydrochloric acid, or reduction of the nitro group, for example with NaHS in water, renewed diazotization and coupling of the diazotization product to a naphthalene compound of the formula (XIVa–c to XVII).

The diazotization or tetrazotization is carried out, for example, in water in the presence of hydrochloric or sulfuric acid and sodium nitrite at 0°–10° C. The coupling is usually carried out in an alkaline sodium carbonate medium, and in the case of (XIVc) in an acid medium at pH=1–4 in water.

The stilbene-azo dyestuffs of the formula (I) are employed according to the invention for dyeing and/or printing substrates containing hydroxyl and/or amide groups, and dye cellulose-containing materials, in particular paper, cotton and viscose, as well as leather, in black, green, blue or red color shades with good wet- and light-fastness properties.

The dyestuffs (I) can be used according to the invention by all the processes customary for substantive dyestuffs in the paper and textile industry, in particular in pulp and surface dyeing of paper for sized or nonsized grades starting from bleached or unbleached cellulose of various origins, such as softwood or hardwood sulfite and/or sulfate cellulose. They can also be used in yarn and piece goods dyeing of cotton, viscose and linen by the exhaust process from a long liquor or in a continuous process, and for dyeing leather, for example by the drum process.

Such dyeing processes are known, for example, from Ullmann's Encyclopedia of Industrial Chemistry, VCH Verlagsgesellschaft mbH, 5th Edition, Volume A15, page 259 (1990); Volume A18, page 545 (1991) and Volume A26, page 351 (1995).

In pulp dyeing of paper, a procedure is in general followed in which the dyestuff is added in solid form or as an aqueous solution (for example in an amount of 0.05 to 3%, based on the fibers) to an aqueous suspension of the fibrous materials (about 0.3% strength, mechanical woodpulp or, preferably, cellulose). The following are as a rule added to this suspension: fillers, such as calcium carbonate or kaolin; sizing agents, such as rosins, aluminum sulfate or alum; and auxiliaries for accelerating dewatering or for improving wet strength. This pulp slurry is suctioned off over a screen on the papermaking machine and then dried.

Surface dyeing of paper is usually carried out in a sizing press. The dyestuff is added to the aqueous coating composition, which, if appropriate, comprises fillers, such as calcium carbonate, kaolin or titanium oxide; binders and other auxiliaries. The paper is coated with this composition in the sizing press, dried and, if necessary, smoothed between rollers.

Dyeing of leather by the drum dyeing process is carried out in drums or rotating vats. Dyeing is carried out in 1 to 3 times the amount of dye liquor, based on the leather, at temperatures up to 60° C. In addition to the dyestuffs, the liquor can also comprise anionic auxiliaries for improving levelness, nonionic detergents, acids or bases for controlling the uptake capacity and, if appropriate, further additives. After dyeing, the leather is acidified, for example with 1–2% of formic, acetic or lactic acid, and dried.

Dyeing of cotton is usually carried out by the exhaust process. In addition to the dyestuff, the aqueous dye liquor in general comprises salts, such as sodium chloride or sodium sulfate. Dyeing is as a rule carried out in the weakly acid pH range at temperatures of 80°–95° C., or under pressure at 130° C. The cotton is then cooled in stages and washed with cold water.

Alternatively, cotton can be dyed by the continuous process, in which the fabric is impregnated with a dyestuff solution, pressed off and then fixed, for example in a stream of steam or in a hot salt bath (80°–90° C.).

The stilbene-azo dyestuffs of the formula (I) can be employed according to the invention as solid or liquid dyestuff preparations for the particular dyeing processes. They are preferably employed in the form of aqueous preparations, in particular solutions. These aqueous dyestuff preparations in general comprise one or more dyestuffs of the formula (I), if appropriate further anionic substantive dyestuffs for adjusting the shade, if appropriate suitable organic solvents, which can also include hydrotropic compounds, and further auxiliaries and/or stabilizers. It is advantageous to prepare the aqueous dyestuff solutions in the course of the dyestuff synthesis itself, without intermediate isolation of the dyestuff.

Use in the form of aqueous dyestuff preparations is particularly preferred for dyeing or printing paper. A stable, aqueous concentrated dyeing preparation can be prepared in the generally customary manner, for example by dissolving the dyestuff in water, if appropriate with the addition of one or more auxiliaries, for example a hydrotropic compound or a stabilizer.

The aqueous dyestuff preparations in general comprise about 0.5 to 20% by weight of one or more dyestuffs of the formula (I) and 80 to 99.5% by weight of water and/or solvents and, if appropriate, further customary constituents.

Preferred organic solvents here are alcohols and ethers or esters thereof, carboxylic acid amides, ureas, sulfoxides and sulfones, in particular those having molecular weights<200. Particularly suitable solvents are, for example, methanol, ethanol, propanol and isopropanol; ethylene glycol, propylene glycol, diethylene glycol, thiodiethylene glycol, dipropylene glycol, pentamethylene glycol, triethylene glycol and polyethylene glycol; butanediol, 1,5-pentanediol and 1,2-dihydroxypropane; glycerol and 1,3,6-hexanetriol; β-hydroxypropionitrile; ethylene glycol monoethyl and -propyl ether, ethylene diglycol monoethyl ether, triethylene glycol butyl ether, butylpolyglycol, 1-methoxy-2-propanol and 2-methoxy-1-propanol; formamide, N,N-dimethylformamide, pyrrolidone, ε-caprolactam, N-methylcaprolactam, butyrolactone and caprolactone; 2-hydroxyethyl acetate, 2-(2'-hydroxy)-ethyl acetate and glycol acetate; urea, tetramethylurea, 1,3-dimethyl-2-imidazolidinone and N,N-dimethylolpropyleneurea; and dimethyl sulfoxide, dimethyl sulfone and sulfolane.

Further possible customary additives for aqueous dyestuff preparations, in particular for printing inks, are those ionic or nonionic substances with which the viscosity and/or surface tension can be adjusted to the ranges required for the use, such as, for example, anionic, cationic or neutral surfactants, such as dispersing agents and viscosity regulators. The function of viscosity regulators can be taken over, for example, by the organic solvents.

The dyestuff preparations according to the invention can also comprise other dyestuffs which do not correspond to the formula (I).

Preferred aqueous dyestuff preparations, in particular dyestuff solutions, are those comprising 0.5 to 20% by weight, in particular 1 to 15% by weight, of one or more dyestuffs, at least one corresponding to the formula (I), 50 to 99.5% by weight, in particular 85 to 99% by weight, of water, 0 to 30% by weight, in particular 0 to 20% by weight, of one or more organic solvents, 0 to 30% by weight, in particular 0 to 10% by weight, of additives which influence the viscosity and/or surface tension, the sum of the contents mentioned making up 100% by weight.

The aqueous dyestuff preparations can be prepared by dissolving the dyestuff salts of the formula (I) in water or by direct use of the synthesis solutions, which, if appropriate, have first been subjected to an ion exchange process and/or a membrane separation process, for example a desalination by pressure permeation, and/or by addition of one or more of the abovementioned organic solvents and/or additives at a temperature of, for example, 20° to 100° C., if appropriate at elevated temperatures of 30° to 100° C., in particular 30° to 50° C., and with the addition of inorganic and/or organic bases.

Instead of the salts of the dyestuffs (1), it is also possible to employ the corresponding free acids in combination with at least equimolar amounts of the corresponding organic and/or inorganic bases.

Inorganic bases which can be employed are, for example, lithium hydroxide, sodium hydroxide or potassium hydroxide and lithium carbonate, sodium carbonate or potassium carbonate.

Organic bases which can be used are, for example, ethanolamine, diethanolamine, triethanolamine, N-methyl ethanol amine, N,N-dimethyl ethanol amine, N-methyldiethanolamine, 1-amino-2-propanol, 2-amino-1-propanol, diisopropanolamine, N-2-hydroxyethyldiisopropanolamine, N,N,N-tris-[2-(2'-hydroxyethoxy)-ethyl]-amine, tetramethylammonium hydroxide or sodium methylate, lithium methylate or potassium tert-butylate.

The aqueous dyestuff preparations according to the invention are furthermore suitable for the preparation of printing inks, which can also be employed, in particular, as recording liquids by the ink-jet method.

The invention therefore furthermore relates to printing inks comprising at least one stilbene-azo dyestuff of the formula (I), and the use thereof as recording liquids for ink-jet recording systems. A preferred form comprises those dyestuffs of the formula (I), mixtures of those dyestuffs of the formula (I) or mixtures of dyestuffs of the formula (I) with other dyestuffs which are suitable for producing black prints.

The ink-jet method of the process according to the invention is to be understood as meaning an ink-jet recording process in which the ink drops are sprayed onto the substrate. The fine ink droplets can be produced by various processes. They are preferably produced by the generally known thermal-jet, bubble-jet, piezo-jet or valve ink-jet processes. These processes are known, for example, from T. L. Dawson, Rev. Prog. Coloration, 22, 22 (1992).

The following advantages result when the dyestuffs according to the invention are used in the form of their aqueous preparations, such as are described in detail above, as printing inks for ink-jet recording systems: the physical properties, such as viscosity, surface tension and the like, are in suitable ranges; the recording liquid causes no blockages in the fine release openings of ink-jet recording devices; images of high optical density are produced; during storage, no change in the physical properties and/or deposition of solid constituents occurs in the recording liquid; the recording liquid is suitable for recording on various recording media without limitations in respect of the nature of the recording media; the recording liquid is fixed rapidly and produces images of excellent water-resistance, light-fastness, abrasion-resistance and resolution.

EXAMPLES

The water employed in the examples was completely deionized in all cases.

Example 1

6.45 g of 4,4'-diamino-stilbene-2-sulfonic acid, as the dihydrochloride (for the preparation, cf. EP-A 0 376 032), were dissolved in 500 ml of water at pH=12.5 with 40% strength by weight sodium hydroxide solution, and 8.5 ml of sodium nitrite solution (30 g of $NaNO_2$ in 100 ml of solution) were added. This mixture was metered into a mixture of 62 ml of 32% strength by weight hydrochloric acid, 50 g of ice and 0.1 ml of sodium nitrite solution (10 g in 100 ml) at 2° to 5° C. in the course of 2 hours. The mixture was subsequently stirred for 1 hour.

13.9 g of 1-hydroxy-7-(3-carboxyanilino)-naphthalene-3-sulfonic acid (91.6% strength) were dissolved in a mixture of 265 ml of 20% strength by weight sodium carbonate solution and 115 ml of water. The above tetrazotization mixture was added dropwise to this solution in the course of 2 hours. At the end, a pH of 9.8 was reached. After the mixture had been subsequently stirred for 1 hour, it was filtered with suction. 52.5 g of a moist paste of the dyestuff of the formula (I) as the sodium salt, where X=Y=formula (IV) and

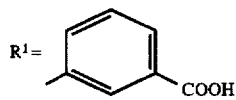

were obtained.

This paste was dissolved in 500 ml of water and filtered three times over a "blue ribbon 589³" filter from Schleicher und Schüill.

The solution showed a $\lambda_{max}$ value of 581 nm.

Lignin-free paper was dyed in the pulp in a bluish-black color shade with excellent waste water values and wet-fastness properties.

The above solution was then filtered twice over a microfilter, first over a 1.2 μm PTFE filter and then over a 0.2 μm PTFE filter, in a Sartorius pressure filter apparatus under 8 bar. An empty ink cartridge, cleaned in an ultrasonic bath, of a Hewlett-Packard Deskjet-plus printer was filled with this solution. The print on various commercial papers was deep black with very good water-fastness properties.

Example 2 a) 32.0 g of 4-amino-4'-acetylaminostilbene-2-sulfonic acid (for the preparation, cf. EP-A 0 376 032) were dissolved in 1 l of water at 80° C. by addition of 3 g of lithium hydroxide and the solution was filtered. 17 ml of sodium nitrite solution (30 g of $NaNO_2$ in 100 ml of aqueous solution) were added at 80° C. This solution was pumped into a mixture of 100 ml of 33% strength by weight hydrochloric acid, 1 l of ice-water and 2 drops of the above sodium nitrite solution in the course of 1 hour. The temperature was kept at 2 to 5° C. by addition of a total of 500 g of ice. The suspension was subsequently stirred at this temperature for 1 hour and the mixture was then pumped into a solution of 26.6 g of 1-hydroxy-7-(4-methoxyanilino) naphthalene-3-sulfonic acid Na salt in a mixture of 300 ml of 20% strength by weight sodium carbonate solution and 640 ml of ice-water at 2° to 5° C. in the course of 2 hours. The mixture was subsequently stirred overnight, during which the temperature rose gradually to room temperature. The brown-black suspension was filtered off with suction. 125 g of paste of the formula (XX) (shown in the form of the free acid)

the pH was brought to 10.5. 1 l of ice-water and 16.7 ml of sodium nitrite solution (30 g of $NaNO_2$ in 100 ml of aqueous solution) were added. The mixture was pumped into a mixture of 200 ml of ice-water and 30 ml of 33% strength by weight hydrochloric acid at 2° to 5° C. in the course of 2 hours and the mixture was kept at this temperature for 1 hour. This diazotization mixture was pumped into a solution of 31.7 g of 7-amino-1-hydroxynaphthalene-3,6-disulfonic acid (58% strength by weight) in 300 ml of 20% strength by weight sodium carbonate solution at 2 to 5° C. in the course of 1.5 hours. The mixture was stirred overnight, during which the temperature was allowed to come to room temperature. 350 g of sodium chloride were added to the black solution and the temperature was controlled at 70° C. for 1 hour. After cooling to room temperature, the mixture was filtered with suction. 116 g of paste were obtained. This was dissolved in 700 ml of water at 50° C. and the solution was salted out with 160 g of sodium chloride. Filtration with suction gave 99 g of paste of the formula (I) where X=a radical of the formula (IV), $R^1$=4-methoxyphenyl and Y=a radical of the formula (V).

This paste was dissolved in 400 ml of water. Since a gelatinous product precipitated out overnight, the pH was brought to 1.0 with 33% strength by weight hydrochloric acid and the mixture was filtered with suction. 96 g of paste were obtained, and were mixed again with 400 ml of water and dissolved by means of solid lithium hydroxide by adjusting the pH to 8.0. The solution was stable.

This solution showed a $\lambda_{max}$ value of 574 nm.

Lignin-free paper was dyed in the pulp in a black color shade with excellent waste water values and wet-fastness properties.

A mixture of 9.5 g of 2-pyrrolidone and 9.5 g of 1,5-pentanediol was added to 100 g of the above solution. This solution was filtered over a "blue ribbon 5893" filter and then filtered successively over PTFE microfilter membranes of 5.0, 1.2, 0.54 and 0.2 μm pore size with a Sartorius pressure filter apparatus under a pressure of 8 bar. The pH was brought to 8.0 by addition of solid lithium hydroxide.

An empty ink cartridge, which had been cleaned in an ultrasonic bath, of a Hewlett-Packard Deskjet-plus printer was filled with this solution. The print on various commercial papers was deep black with very good water-fastness properties.

Example 3 a) Tetrazotization was carried out as described in Example 1 under a).

b) 7.1 g of 1-hydroxy-7-(3-carboxyanilino)-naphthalene-3-sulfonic acid and 4.7 g of 1-hydroxy-7-amino-

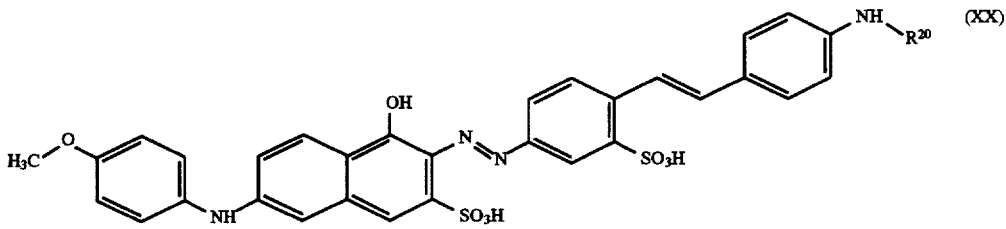

where $R^{20}$=acetyl were obtained.

b) 125 g of the paste obtained under a) were stirred into a mixture of 250 ml of water and 50 ml of 33% strength by weight hydrochloric acid at 95° C. for 8 hours. The mixture was then filtered with suction. 102 g of a paste of the formula (XX) where $R^{20}$=hydrogen were obtained.

c) 102 g of the paste obtained under b) were dissolved in 500 ml of water, by addition of solid lithium hydroxide, and naphthalene-3-sulfonic acid were dissolved in a mixture of 160 ml of 20% strength by weight sodium carbonate solution and 300 ml of ice-water. The above tetrazotization mixture was added dropwise to this solution at 0° to 5° C in the course of 2 hours, a pH of 8.7 being reached at the end. The mixture was filtered with suction. 37.5 g of a moist paste of a mixture of four dyestuffs of the formula (I) as the sodium salt were obtained:

Dyestuff 1) X = formula (IV) where

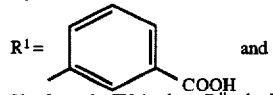

Y = formula (IVa) where R¹' = hydrogen,

Dyestuff 2) X = formula (IV) where R¹ = hydrogen and

Y = formula (IVa) where R¹' = 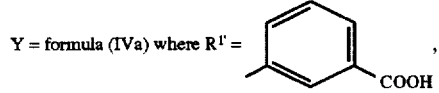 ,

Dyestuff 3) X = Y = formula (IV) where R¹ = 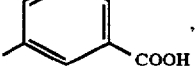 ,

Dyestuff 4) X = Y = formula (IV) where R¹ = hydrogen.

This paste was beaten into 400 ml of water and the pH was brought to 8.0 with 20 ml of 33% strength by weight hydrochloric acid. After 2 hours at room temperature, the mixture was filtered with suction again. 76.2 g of a moist paste were obtained. This paste was dissolved in 200 ml of water at pH=9.5 to 10, with the addition of lithium hydroxide, and a mixture of 19 g of 2-pyrrolidone, 19 g of 1,5-pentanediol and 10 g of urea was added. This solution was filtered as described in Example 1, brought to pH 9 with lithium hydroxide and used for printing. The print on various commercial papers was slightly bluish-tinged black with very good water-fastness properties.

The following dyestuffs listed in Table 1 were prepared completely analogously.

| Example | X | Y | λmax Color shade | Analogously to Example |
|---|---|---|---|---|
| 4 | naphthalene with OH, NH₂, SO₃H, -N=N-, SO₃H | naphthalene with OH, NH₂, SO₃H, -N=N-, HO₃S | 578 nm black | 1 |
| 5 | naphthalene with OH, NH₂, -N=N-, SO₃H | naphthalene with OH, NH₂, -N=N-, HO₃S | 562 nm black | 1 |
| 6 | NH-phenyl-SO₃H on naphthalene with OH, -N=N-, SO₃H | NH-phenyl-SO₃H on naphthalene with OH, -N=N-, HO₃S | 583 nm black | 1 |
| 7 | NH-phenyl-OCH₃ on naphthalene with OH, -N=N-, SO₃H | NH-phenyl-OCH₃ on naphthalene with OH, -N=N-, HO₃S | 508/590 nm brownish-black | 1 |
| 8 | naphthalene with OH, SO₃H, -N=N-, H₂N | naphthalene with OH, SO₃H, -N=N-, H₂N | red | 1 |
| 9 | NH-phenyl-COOH on naphthalene with OH, -N=N-, SO₃H | NH-phenyl-OCH₃ on naphthalene with OH, SO₃H, -N=N-, SO₃H | 566 nm black | 2 |

-continued

| Example | X | Y | $\lambda_{max}$ Color shade | Analogously to Example |
|---|---|---|---|---|
| 10 | naphthol with -N=N-, OH, SO₃H, NH-phenyl-COOH | naphthol with -N=N-, OH, SO₃H, NH₂-phenyl | 575 nm black | 2 |
| 11 | naphthol with -N=N-, OH, SO₃H, NH-phenyl-COOH | naphthol with -N=N-, OH, SO₃H, NH-phenyl-OCH₃ | black | 3 |
| 12 | naphthol with -N=N-, OH, SO₃H, NH-phenyl-OCH₃ | naphthol with -N=N-, OH, SO₃H, NH-phenyl-COOH | | |
| | naphthol with -N=N-, OH, SO₃H, NH₂ | naphthol with -N=N-, OH, SO₃H, NH₂ | dark blue | 2 |
| 13 | naphthol with -N=N-, OH, SO₃H, NH-phenyl | naphthol with -N=N-, OH, SO₃H, NH-phenyl-COOH | black | 2 |

-continued

| Example | X | Y | λ_max Color shade | Analogously to Example |
|---|---|---|---|---|
| 14 | naphthalene with OH, -N=N-, SO₃H, NH-CO-C₆H₄-CH₃ | naphthalene with OH, -N=N-, SO₃H, NH-CO-C₆H₄-CH₃ | reddish-tinged black | 1 |
| 15 | naphthalene with OH, -N=N-, SO₃H, NHCH₃ | naphthalene with OH, -N=N-, SO₃H, NHCH₃ | black | 1 |
| 16 | naphthalene with OH, -N=N-, SO₃H, NH-(CH₂)₃-N(CH₃)₂ | naphthalene with OH, -N=N-, SO₃H, NH-(CH₂)₃-N(CH₃)₂ | black | 1 |
| 17 | naphthalene with OH, -N=N-, CH₃NH, SO₃H | naphthalene with OH, -N=N-, H₃CHN, SO₃H | red | 1 |
| 18 | naphthalene with OH, -N=N-, H₂N, SO₃H | naphthalene with OH, -N=N-, NHC₆H₅, SO₃H | brown | 2 |
| 19 | naphthalene with OH, -N=N-, SO₃H, NHCOCH₃ | naphthalene with NH₂, OH, -N=N-, SO₃H, SO₃H | bluish-tinged black | 3 |

-continued
| Example | X | Y | $\lambda_{max}$ Color shade | Analogously to Example |
|---|---|---|---|---|
| 20 |  |  | bluish-tinged black | 2 |
| 21 |  |  | black | 2 |
| 22 |  |  | black | 2 |
| 23 |  |  | black | 1 |
| 24 |  |  | black | 2 |

-continued

| Example | X | Y | λ_max Color shade | Analogously to Example |
|---|---|---|---|---|
| 25 | [naphthalene with OH, -N=N-, SO₃H, NHCO-C₅H₁₁] | [naphthalene with OH, -N=N-, SO₃H, NH-CO-C₅H₁₁] | reddish-tinged black | 1 |
| 26 | [naphthalene with OH, -N=N-, SO₃H, NHC₂H₅] | [naphthalene with OH, -N=N-, SO₃H, NH-CO-phenyl] | black | 2 |

Analogously to Example 1, an ink was prepared from these dyestuffs of Examples 4 to 26 and used for printing. The prints were as a rule intense and had good water-fastness properties.

An ink could be prepared from the following dyestuffs in Table 2 and used for printing in the same way:

TABLE 2

| Example | X | Y | Colour shade |
|---|---|---|---|
| 27 | naphthalene with -N=N-, OH, SO₃H, NH₂, SO₃H | naphthalene with -N=N-, OH, SO₃H, NH₂, SO₃H | blue |
| 28 | naphthalene with -N=N-, OH, SO₃H, NH₂ | naphthalene with -N=N-, OH, SO₃H, NH₂ | violet |
| 29 | naphthalene with -N=N-, OH, SO₃H, NHCOCH₃ | naphthalene with -N=N-, OH, SO₃H, NHCOCH₃ | violet |
| 30 | naphthalene with -N=N-, OH, SO₃H, NH-phenyl | naphthalene with -N=N-, OH, SO₃H, NH-phenyl | black |
| 31 | naphthalene with -N=N-, OH, SO₃H, NH-CO-phenyl | naphthalene with -N=N-, OH, SO₃H, NH-CO-phenyl | reddish-tinged black |
| 32 | naphthalene with -N=N-, OH, SO₃H, NH-CO-phenyl | naphthalene with -N=N-, OH, SO₃H, NH₂ | black |

TABLE 2-continued

| Example | X | Y | Colour shade |
|---|---|---|---|
| 33 | [structure: naphthalene with OH, -N=N-, SO₃H, and NH-phenyl] | [structure: naphthalene with NH₂, OH, -N=N-, SO₃H] | bluish-tinged black |
| 34 | [structure: naphthalene with NH₂, OH, -N=N-, SO₃H] | [structure: naphthalene with NH₂, OH, -N=N-, SO₃H] | blue |
| 35 | [structure: naphthalene with OH, OH, -N=N-, SO₃H, NH-CO-phenyl-COOH] | [structure: naphthalene with NH-CO-phenyl-COOH, SO₃H, -N=N-] | red |
| 36 | [structure: naphthalene with OH, -N=N-, SO₃H, NH-(CH₂)-N(CH₃)₂] | [structure: naphthalene with NH₂, OH, SO₃H, -N=N-, SO₃H] | blue-black |
| 37 | [structure: naphthalene with OH, OH, -N=N-, SO₃H, SO₃H] | [structure: naphthalene with NH₂, OH, -N=N-, SO₃H] | blackish-tinged red |
| 38 | [structure: naphthalene with OH, OH, -N=N-, SO₃H] | [structure: naphthalene with OH, OH, -N=N-, SO₃H] | red |

TABLE 2-continued

| Example | X | Y | Colour shade |
|---|---|---|---|
| 39 | [naphthalene with OH, OH, -N=N-, SO₃H] | [naphthalene with OH, NH₂, -N=N-, SO₃H] | black |
| 40 | [naphthalene with OH, NHCOCH₃, -N=N-, SO₃H] | -NHCOCH₃ | red |
| 41 | [naphthalene with OH, N-phenyl-COOH, -N=N-, SO₃H] | -NHCOCH₃ | brown |
| 42 | [naphthalene with OH, NH₂, -N=N-, SO₃H] | -CN | black |

Example 43

5 g of a mixture of 70% by weight of birchwood sulfate cellulose and 30% by weight of pinewood sulfate cellulose were beaten to 30° to 40° SR in a laboratory beater. This mixture was topped up to 1 l with water. A solution of 25 mg of the dyestuff of Example 1 in 2.5 ml of water, 10 ml of a 1% strength by weight aqueous solution of rosin size Dynacoll VS 50 from Akzo Chemie, Duiren, and 15 ml of a 1% strength by weight aqueous solution of aluminum sulfate was added to this mixture, the mixture being stirred for 8 minutes between the additions. The dyed and sized paper pulp was introduced onto a laboratory sheet-forming machine, distributed uniformly and suctioned off. The black-colored sheet of paper was then pressed between filter paper and dried. The waste water from the dyeing comprised 1% of the amount of dyestuff employed.

The dyestuffs of Examples 2 to 42 could be employed completely analogously.

We claim:

1. A process for dyeing or printing materials containing cellulose or amide groups, or containing cellulose and amide groups, in which the improvement comprises employing as the dyestuff at least one stilbene-azo dyestuff which, in the form of the free acid, corresponds to the formula (I)

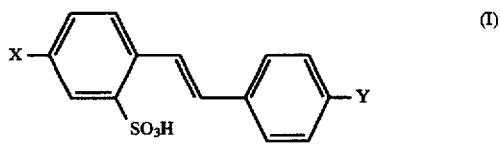

(I)

in which

X and Y independently of one another represent —N=N—R, and

R represents a radical of the formula

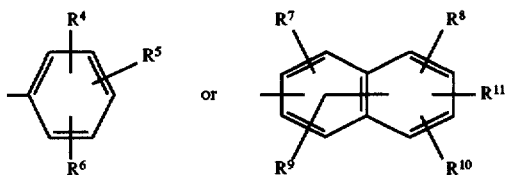

in which $R^4$, $R^5$, $R^6$, $R^7$, $R^8$, $R^9$, $R^{10}$ and $R^{11}$ independently of one another represent H, halogen, —OH, —OR$^3$, —NR$^1$R$^2$, R$^3$, —SO$_3$H, —SO$_2$NR$^1$R$^2$, —O—COR$^3$ or —NHCOR$^3$ and $R^1$ and $R^2$ independently of one another represent hydrogen, or represent formyl, or represent in each case optionally $C_1$–$C_4$-alkyl-, hydroxyl-, $C_1$- to $C_4$-alkoxy-, amino-, $C_1$- to $C_4$-mono- or -dialkylamino-, morpholino-, piperidino-, N—$R^{12}$-piperazino-, halogen-, cyano-, nitro-, phenyl-, carboxyl-, $C_1$- to $C_4$-alkoxycarbonyl-, aminocarbonyl-, $C_1$- to $C_4$-mono- or -dialkylaminocarbonyl-, sulfo- or OSO$_3$H-substituted $C_1$- to $C_6$-alkyl, $C_1$- to $C_6$-alkylcarbonyl, $C_1$- to $C_6$-alkylsulfonyl, $C_1$- to $C_6$-alkoxycarbonyl, $C_1$- to $C_6$-mono- or -dialkylaminocarbonyl, $C_5$- to $C_7$-cycloalkyl, $C_6$- to $C_{10}$-aryl, $C_6$- to $C_{10}$-arylcarbonyl or $C_6$- to $C_{10}$-arylsulfonyl, or $R^1$ and $R^2$, together with the N atom to which they are bonded, represent a 5- to 7-membered saturated heterocyclic ring, which can contain further heteroatoms from the series consisting of O, S, SO$_2$ and NR$^{12}$, wherein $R^{12}$ has the meaning of $R^1$ or $R^2$, and $R^3$ represents in each case optionally $C_1$–$C_4$-alkyl-, hydroxyl-, $C_1$–$C_4$-alkoxy-, halogen-, cyano- or nitro-substituted $C_1$- to $C_6$-alkyl, $C_6$- to $C_{10}$-aryl or $C_6$- to $C_{10}$-aryl-$C_1$–$C_6$-alkyl.

2. The process as claimed in claim 1, wherein at least one stilbene-azo dyestuff of the formula (I) in which X and Y independently of one another represent —N=N—R, and R represents a radical

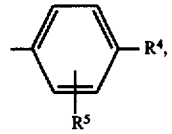

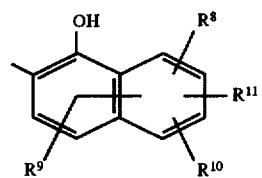

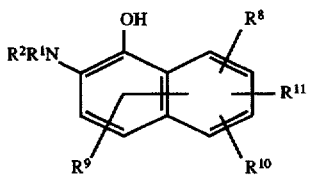

in which $R^1$, $R^2$, $R^4$, $R^5$, $R^8$, $R^9$, $R^{10}$ and $R^{11}$ have the meaning given in claim 1, is employed.

3. The process as claimed in claim 1, wherein at least one stilbene-azo dyestuff of the formula (I) in which X and Y independently of one another represent —N=N—R, in which R represents a radical of the formula

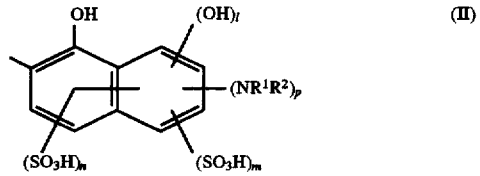

(II)

or

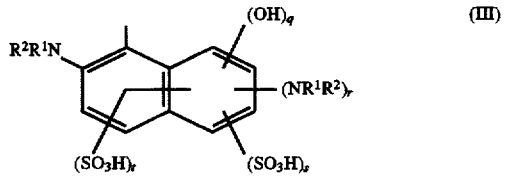

(III)

in which i, m, n, p, q, r, s and t independently of one another represent 0 or 1, where the sums are m+n=1 and s+t=1, and $R^1$ and $R^2$ have the meaning given in claim 1, is employed.

4. The process as claimed in claim 3, wherein at least one stilbene-azo dyestuff of the formula (I) in which X and Y independently of one another represent —N=N—R, in which R represents a radical of the formula (II) or (III), in which R$^1$ and R$^2$ independently of one another represent hydrogen, or represent optionally hydroxyl-, methoxy-, ethoxy-, amino-, methylamino-, ethylamino-, dimethylamino-, diethylamino-, morpholino-, piperazino-, N-ethylpiperazino-, N-hydroxyethylpiperazino-, N-aminoethylpiperazino-, fluorine-, chlorine-, carboxyl- or OSO$_3$H-substituted C$_1$- to C$_6$-alkyl, or represent in each case optionally hydroxyl-, methoxy-, ethoxy-, fluorine-, chlorine- or phenyl-substituted C$_1$- to C$_6$-alkylcarbonyl, C$_1$ to C$_6$-alkylsulfonyl, C$_1$- to C$_6$-alkoxycarbonyl or C$_1$- to C$_6$-mono- or -dialkylaminocarbonyl, or represent cyclopentyl or cyclohexyl, or represent in each case optionally methyl-, ethyl-, hydroxyl-, methoxy-, ethoxy-, fluorine-, chlorine-, amino-, cyano-, nitro-, carboxyl-, aminocarbonyl- or sulfo-substituted phenyl, naphthyl, benzoyl, naphthylcarbonyl, benzenesulfonyl or naphthalenesulfonyl, or R$^1$ and R$^2$, together with the N atom to which they are bonded, represent morpholino, piperazino, N-ethylpiperazino, N-hydroxyethylpiperazino, N-aminoethylpiperazino or

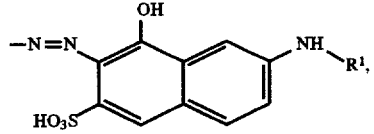

n, p, q and s represent 1 and m, i, r and t independently of one another represent 0 or 1, is employed.

5. The process as claimed in claim 1, wherein at least one stilbene-azo dyestuff of the formula (I) in which X represents a radical of the formula (IV) which, in the form of its free acid, corresponds to the formula

   (IV)

in which

R$^1$ represents hydrogen, phenyl, methoxyphenyl, hydroxyethoxyphenyl, carboxyphenyl, dicarboxyphenyl or sulfophenyl, and Y represents a radical of the formula (IVa), (V), (VI) or (VII) which, in the form of the free acid, corresponds to the formula

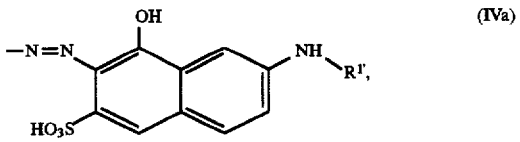   (IVa)

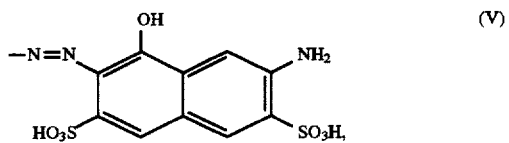   (V)

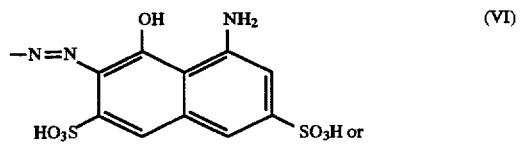   (VI)

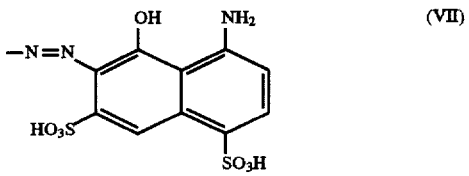   (VII)

in which R$^{1'}$ has the same meaning as R$^1$, but R$^1$ and R$^{1'}$ are preferably not identical if X represents a radical (IV) and Y represents a radical (IVa), is employed.

6. The process as claimed in claim 1, wherein the materials to be dyed are paper, cotton, viscose or leather.

* * * * *